Sheet 1, 2 Sheets.

C. E. Blake.
Safety Valve.

No. 3,648. Reissued Sept. 28, 1869.

Witnesses.
J. H. Atkinson
J. S. Henning

Inventor.
Chas. E. Blake

N. PETERS, PHOTO-LITHOGRAPHER, WASHINGTON, D. C.

Sheet 2, 2 Sheets.

C. E. Blake.
Safety Valve.

No. 3,648. Reissued Sept. 28, 1869.

Witnesses.
J. H. Atkinson
J. S. Henning

Inventor.
Chas. E. Blake

N. PETERS, PHOTO-LITHOGRAPHER, WASHINGTON, D. C.

UNITED STATES PATENT OFFICE.

CHARLES E. BLAKE, OF SAN FRANCISCO, CALIFORNIA.

IMPROVEMENT IN PUMP DEVICES FOR STEAM AND OTHER ENGINERY.

Specification forming part of Letters Patent No. 86,273, dated January 26, 1869; Reissue No. 3,648, dated September 28, 1869.

*To all whom it may concern:*

Be it known that I, CHARLES EDWARD BLAKE, of San Francisco, in the county of San Francisco and State of California, have invented a new Improvement in Safety-Valves for Hydraulic Apparatus, Steam-Engines, &c.; and I do hereby declare the following, when taken in connection with the accompanying drawings and the letters of reference marked thereon, to be a full, clear, and exact description of the same, and which said drawings constitute part of this specification, and represent, in—

Figure 2:
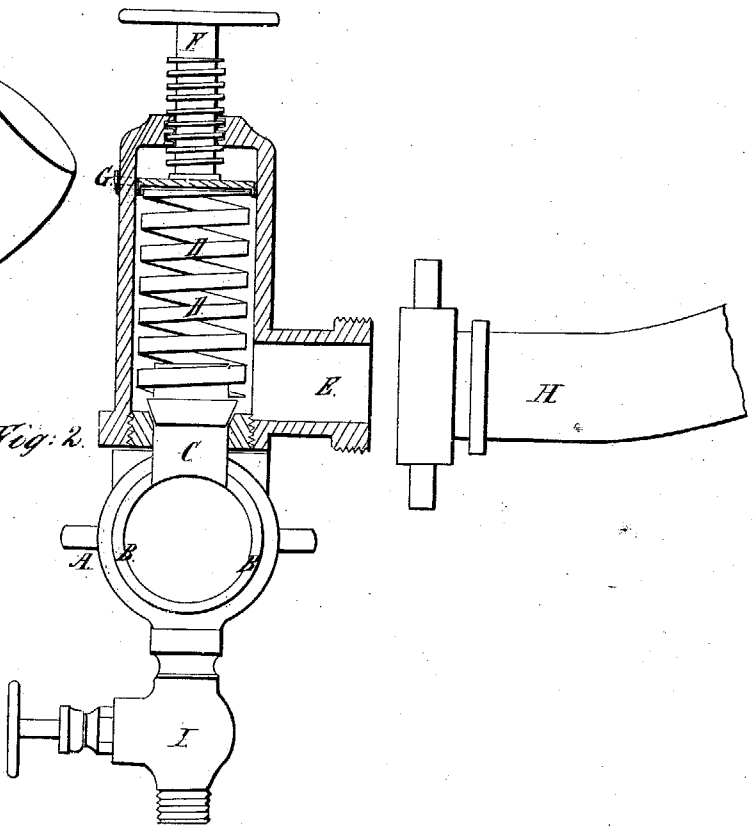
Figure 1:
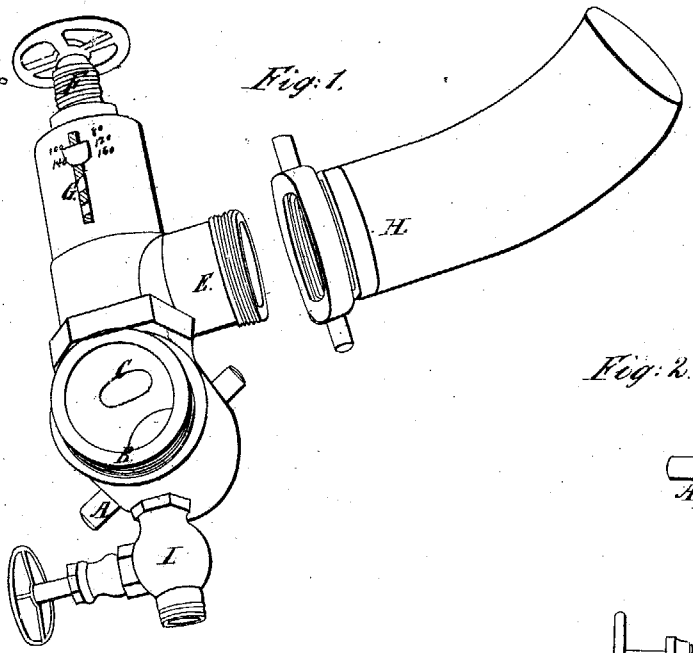
Figure 3:
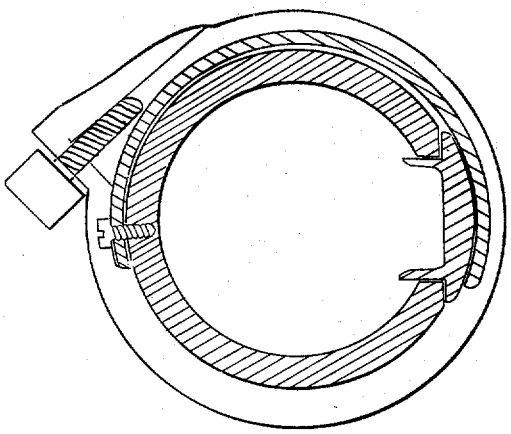
Figure 4:
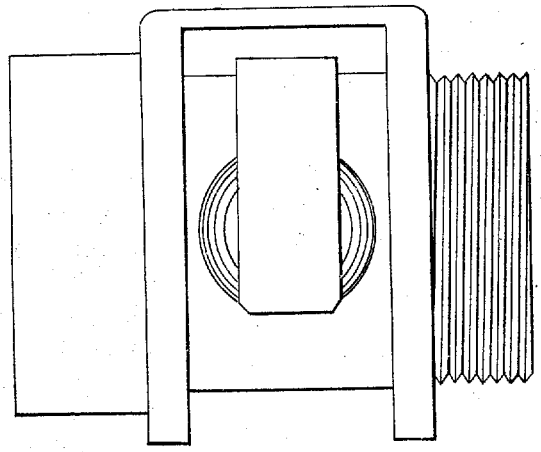

Figure 1, a perspective view of my improvement; Fig. 2, a longitudinal section; Fig. 3, a transverse section, and Fig. 4 a side view of my improvement, which may be attached anywhere along the hose or pipe.

My invention consists of a device to be attached to the pump-body, air-chamber, or hose of a fire-engine or other hydraulic apparatus constructed with a spring-valve or similar piece of mechanism, upon which the water may act, so as to cause the water to force the valve open when it is backed up by reason of the obstruction of the flow in the proper direction, thus removing the pressure by allowing the surplus water beyond the certain given pressure which is required to force the valve open to pass out through a pipe attached to the device for that purpose.

In order that those skilled in the art may be enabled to make my invention, I subjoin the following further description.

In Fig. 1, A represents that portion of my improvement by which it is attached to the engine-pump, air-chamber, or hose. B is the screw or joint for attaching the main hose. C is the escape valve upon which the water acts. D is the spring which controls the valve, holding it in position under the ordinary press of water. F is a screw to regulate the pressure which the valve is to resist. G is a graduated scale showing the pressure of water upon the valve. H is a wasteway hose or pipe to be attached to the safety-valve at E. I is an attachment to be used for the purpose of drawing off water at any time for use.

The spring shown in the drawings is spiral in form; but any other proper medium may be used to confine the valve in place that will give and allow it to act when the pressure upon it shall exceed the desired amount.

Instead of a spiral spring, any other form of spring may be used; or the valve may be operated by a weight, elastic substance, pressure of steam, air, oil, or water, as desired.

In case it is desired to use the safety-valve upon the hose itself, it may be attached in the following manner: A metal or other suitable kind of ring may be placed around the hose at the desired point, having a hollow shoulder upon which the part A may be screwed; or the connection may be made in any other mode, only so that it be complete.

The mode of operation is as follows: Suppose the safety-valve be fastened to the proper part of the engine or other apparatus, and the valve C regulated to resist a pressure corresponding with the amount which the hose is capable of sustaining, which we will suppose to be one hundred and sixty pounds to the square inch. If, as is often the case, the hose be plugged by sand or other matter, or becomes entangled or compressed by heavy substances falling upon it in any manner, so as to obstruct the free passage of the water from the engine-pump or other machine to the outer end of the hose or pipe, instead of the water bursting the pipe, as ordinarily is the case, the pressure caused by the back water and that caused by the working of the machine will raise the valve C and allow the surplus to pass off through the waste-pipe H.

I have thus far described my invention as connected directly with the hose leading from the engine; but it will be evident to those skilled in the use of the apparatus to which my invention is especially adapted that it may with equal facility be applied to other parts of the engine than the leading hose and accomplish the same desired result—that is, relieving the leading hose after a certain given pressure has been attained. As a demonstration of this fact, we will suppose that the valve be attached to the engine in the same manner as before described, and that instead of placing the leading hose on the joint B we place thereon a cap to close that opening, and attach the leading hose to another outlet. Then when the engine is worked no water can pass through at the screw-joint B. Therefore when the pressure is raised so as to operate the valve the surplus water beyond that pressure will, as before, pass out through the wasteway E, and while in many cases it would be preferable to attach the hose at B it is not essential for the relief of the engine or hose that it be attached at that point, the whole object being accomplished by attaching the valve with the wasteway to some point where the pressure is the same as that in the hose.

The construction of the graduated scale or index G may be of any known form, it being only essential that it be arranged so as to denote a pressure to which the valve must be subjected to relieve the hose; and while I prefer that the index be applied directly to the valve, so that it will always indicate the pressure at which the hose will be relieved and water escape, yet it will be evident to those skilled in the art that on such engines as have an indicator attached to show the pressure which the pumps are making upon the water my valve may be set by such indicator—that is to say, if it is desired to carry one hundred pounds the pumps must be first worked up to that pressure, and then the valve adjusted, so as to permit the water to escape. I prefer the fixed indicator, inasmuch as it may be set before the pressure is applied. I therefore do not wish to be understood as confining myself to the attached indicator, it only being essential that an indicator be somewhere upon the machine, so as to act in combination with my valve.

By this invention the pressure of water in the hose may be regulated to any desired amount, and the hose kept from bursting or becoming strained or otherwise injured, in the manner as set forth.

The action of the safety-valve when applied to the hose-pipe itself is similar to its working when otherwise applied.

Having fully described my invention, what I claim as new and useful, and desire to secure by Letters Patent, is—

1. The arrangement of the cylinder A, escape-valve C, spring D, adjusting-screw F, and wasteway E with an indicator, all constructed substantially as set forth.

2. In combination with the subject-matter of the first clause of claim, the joint B, for the attachment of the main or leading hose, substantially as set forth.

3. In combination with the subject-matter of the first clause of claim, the waste-cock I, as specified.

CHAS. E. BLAKE.

Witnesses:
A. J. TIBBITS,
JOHN E. EARLE.